United States Patent [19]

Furuta

[11] Patent Number: 5,703,716
[45] Date of Patent: Dec. 30, 1997

[54] RE-IMAGING CONVERTER LENS APPARATUS AND METHOD

[75] Inventor: Akiko Furuta, Chiba, Japan

[73] Assignee: Nikon Corporation, Tokyo, Japan

[21] Appl. No.: 519,413

[22] Filed: Aug. 24, 1995

[30] Foreign Application Priority Data

Aug. 26, 1994 [JP] Japan .................................. 6-00774
Aug. 26, 1994 [JP] Japan .................................. 6-00775

[51] Int. Cl.[6] .................... G02B 23/00; G02B 9/34
[52] U.S. Cl. ..................... 359/431; 359/423; 359/434
[58] Field of Search ........................... 359/362–363, 359/420–422, 431–435, 831–837, 629; 396/373–386

[56] References Cited

U.S. PATENT DOCUMENTS

| 4,591,901 | 5/1986 | Andrevski | 359/629 |
| 4,867,549 | 9/1989 | Sekine | 359/431 |
| 5,132,838 | 7/1992 | Ohshita | 359/422 |
| 5,563,736 | 10/1996 | Lewis | 359/362 |
| 5,585,965 | 12/1996 | Hayashi et al. | 359/431 |

FOREIGN PATENT DOCUMENTS

| 59-29214 | 2/1984 | Japan . |
| 62-56916 | 3/1987 | Japan . |

*Primary Examiner*—Thong Nguyen
*Attorney, Agent, or Firm*—Klarquist Sparkman Campbell Leigh & Whinston, LLP

[57] ABSTRACT

Apparatus and methods are disclosed for re-imaging a primary image produced by a prime lens to form a positively demagnified secondary image at a secondary image plane, wherein the secondary image is smaller than, but has the same field angle as, the primary image. The apparatus comprises a field lens group and an optical relay. The optical relay can comprise a first lens group having negative refractive power, a second lens group having positive refracting power, and an erecting lens group interposed coaxially between the first and second lens groups. The apparatus also can comprise a beam-splitter imagewise to the optical relay to form multiple secondary images. The apparatus and methods have especial utility for adapting prime lens, designed for use on older, larger TV cameras, for use on newer, smaller TV cameras without sacrificing field angle.

32 Claims, 7 Drawing Sheets

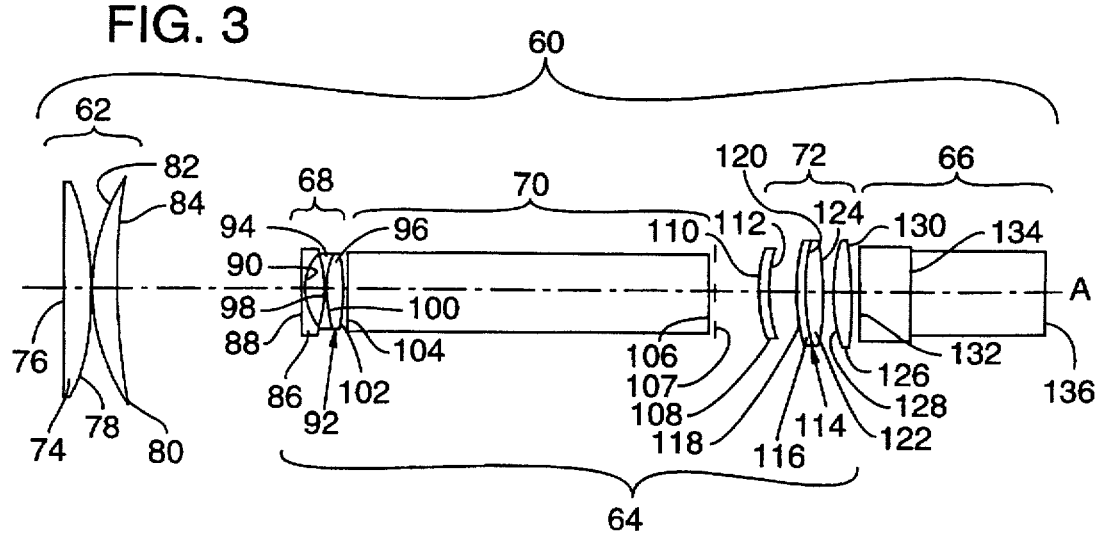
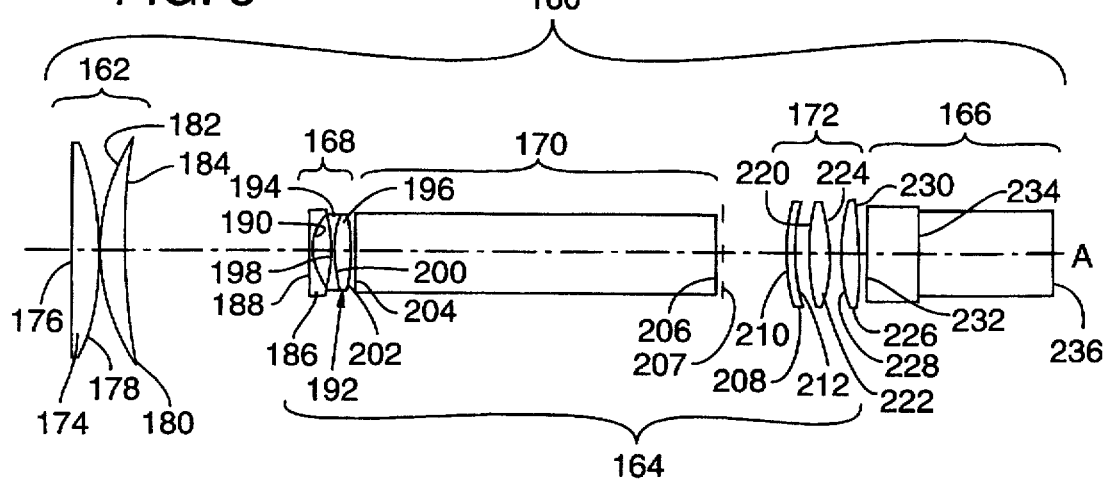
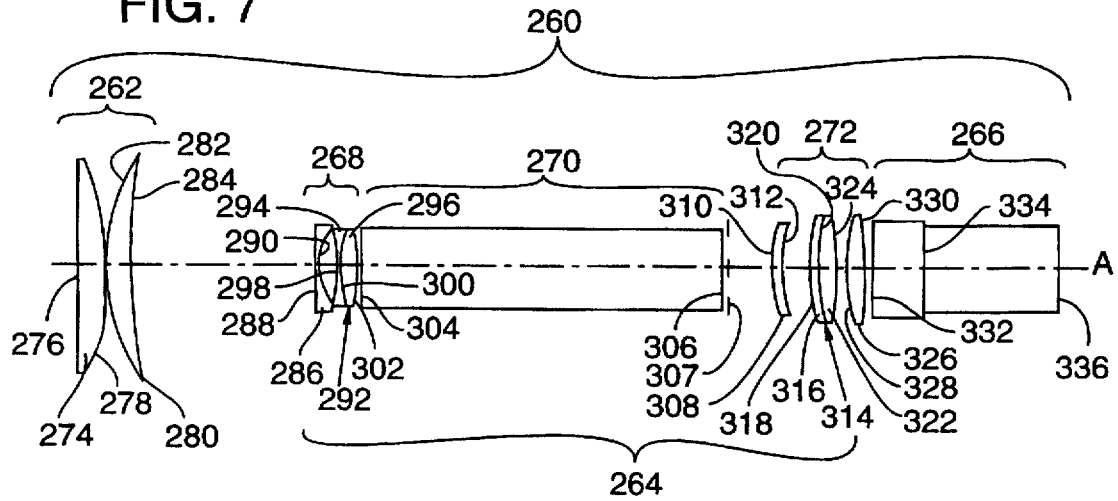

−0.050
(mm)

0.05 (mm)

NA : −0.24

0.200
(mm)

Y = 4.00 (mm)

0.200
(mm)

Y = 4.00 (mm)

1.000
(%)

−0.050
(mm)

0.05 (mm)

NA : −0.24

0.200
(mm)

Y = 4.00 (mm)

0.200
(mm)

Y = 4.00 (mm)

1.000
(%)

FIG. 8D
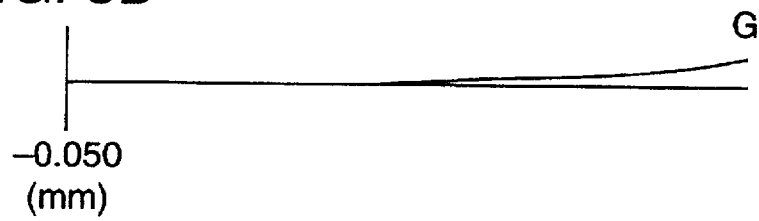
FIG. 8E
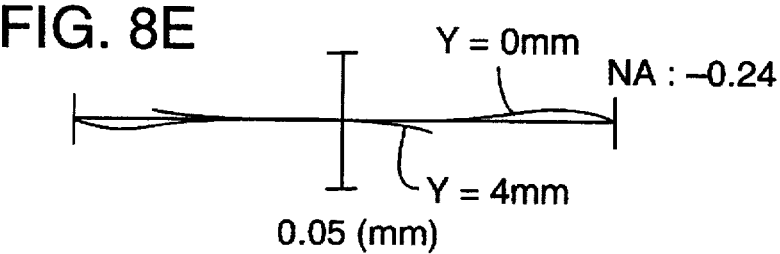
FIG. 8A  FIG. 8B  FIG. 8C
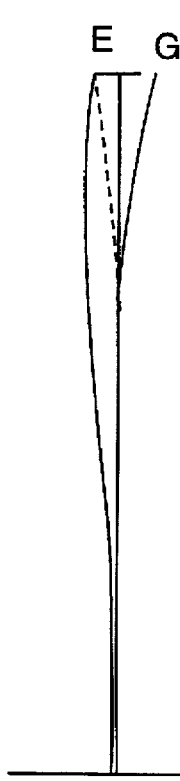
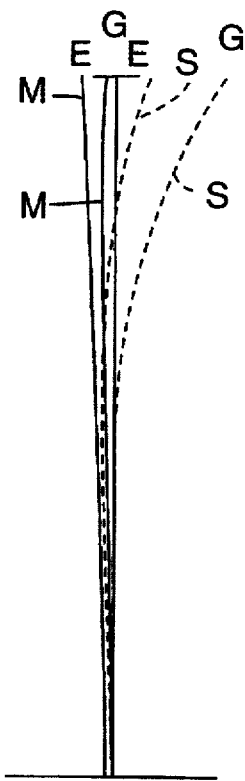
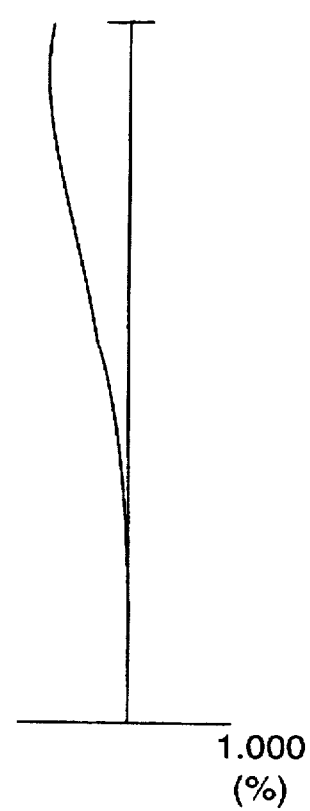

NA : −0.24

0.200 (mm)

Y = 4.00 (mm)

0.200 (mm)

Y = 4.00 (mm)

1.000 (%)

RE-IMAGING CONVERTER LENS APPARATUS AND METHOD

FIELD OF THE INVENTION

This invention relates to optical systems and elements, and methods of using the same, for rendering a photographic lens capable of being used with a camera with which the photographic lens was not originally designed for use.

BACKGROUND OF THE INVENTION

Modern television (TV) cameras typically employ a charge-coupled device (CCD) array placed at the primary image plane of a photographic lens to electronically "sense" light images continuously in real time. Information sensed by the CCD is electronically processed and can be recorded on an appropriate medium such as a videotape. In a "video" camera (regarded herein as a type of TV camera), recording is usually performed inside the camera body; other types of TV cameras, such as for television broadcasting, employ separate recording devices.

As used herein, a "prime lens" is a photographic lens that, alone, would be capable of forming an image on a CCD array of a TV camera. In TV cameras, prime lenses are often used in a "single-lens reflex" manner wherein light refracted by the prime lens is directed simultaneously to multiple destinations in the camera such as multiple CCD arrays.

As used herein, a "screen" refers generally to the CCD array or other surface on which light entering the camera through the prime lens impinges for sensing, recording, or viewing. "Screen size" generally refers to the size of the CCD array. For single-lens reflex operation, a "beam-splitter" (usually a prism) is used, normally disposed between the prime lens and the CCD. The beam-splitter may be a color-separating prism used to separate red, blue and green wavelength images, which are then sensed on separate CCD arrays and electronically recombined (or "color-mixed") to form a color image.

In recent years, TV cameras have become progressively smaller, accompanied by a corresponding decrease in screen size. For example, CCD arrays have recently decreased from 1 inch to ⅔ inch, then to ½ inch. Since a prime lens used with a TV camera is normally designed to produce an image corresponding to a particular screen size, miniaturization of TV cameras has resulted in a need for prime lenses capable of being used with smaller screen sizes.

Unfortunately, redesign of prime lenses often does not keep pace with the rate of camera miniaturization. As a result, there is a dearth of high-quality photographic lenses, especially wide-angle lenses, suitable for smaller screen sizes.

Even though older TV cameras are often considered obsolete, prime lenses from older cameras are usually of very high quality and skill have much potential useful life. Unfortunately, at the present time, these older prime lenses are frequently not usable on newer TV cameras having smaller screens. Thus, there is a need for methods and apparatus for adapting prime lenses (especially wide-angle lenses), originally designed for use with TV cameras having larger screens, for use with TV cameras having smaller screens.

In order to satisfactorily use a prime lens with a TV camera, the image formed by the prime lens, termed the "primary image," preferably should fit substantially completely within the screen. If the primary image is too large relative to the screen, then a portion of the image is lost. A conventional way to correct this problem is to use a "converter lens" that, in conjunction with the prime lens, forms a "secondary image" on the screen. Converter lenses normally have a positive demagnification (e.g., usually a magnification greater than 0 up to about +1) to avoid forming an inverted secondary image.

One type of conventional converter lens, called a "front converter" lens, consists of a single lens element or group of lens elements that can be attached to the front (objectwise) of the prime lens. Front converter lenses typically have a negative overall refracting power. Although a front converter lens demagnifies the primary image by changing the overall focal length of the prime lens, the "back focus" (i.e., the distance along the optical axis between an image and the lens surface closest to the image) of the assembly of prime lens and front converter lens tends to remain the same. This can be disadvantageous. An increased back focus with such an assembly is often required whenever the prime lens was originally designed for use with a camera having a smaller color-separating prism or other single-lens reflex mechanism and thus had a smaller back focus than a prime lens designed for use with the newer, smaller TV cameras.

Another type of conventional converter lens, termed a "rear converter" lens, is interposed between the prime lens and the primary image plane and consists of a single lens element or group of lens elements having an overall positive refracting power. Japanese patent application no. Sho 59-29214 discloses such a rear converter lens that, unfortunately, provides a back focus of at most 23.9 mm which is inadequate to accommodate a color-separating prism (color-separating prisms typically have an overall length of about 40 mm). Japanese patent application no. Sho 62-56916 discloses another such rear converter that, when it is attached to a wide-angle prime lens, the field angle of the prime lens is effectively reduced, thereby rendering the prime lens useless for wide-angle applications.

In modern "single-lens reflex" TV cameras, if the exit pupil of the camera lens is near the CCD, the angle of incidence of secondary image-forming principal rays (relative to the surface normal of the color-separating prism) varies with the height of the image. Also, the color-separating prism used in such cameras has a coating that is "tuned" to enhance reflection for a particular wavelength or wavelengths over a relatively small range of incident ray angles. Use of a conventional converter lens can cause excessive variation in incident ray angles with the height of the secondary image, thereby causing excessive position-dependent variation in reflection and transmission of light of different wavelengths. This results in an undesirable position-dependent variation in image color called "color shading."

Therefore, there is a need for methods and apparatus that can positively demagnify the primary image of a prime lens used on a TV camera so as to enable substantially the entire image to fit onto a smaller screen than that for which the prime lens was originally designed, while maintaining the field angle of the prime lens, providing adequate back focus, and minimizing color shading.

SUMMARY OF THE INVENTION

According to one aspect of the present invention, a re-imaging optical system is provided for use with a prime lens, the prime lens having a particular field angle and a capability of forming a prime image at a primary image plane. The re-imaging optical system comprises a field lens group disposed near the primary image plane in order to redirect the image-forming rays, and an optical relay disposed coaxially imagewise from the field lens. The optical relay is operative to transfer and positively demagnify substantially the entire primary image from the primary image plane to a secondary image plane, disposed imagewise from the optical relay, without reducing the field angle of the prime lens. The optical relay is comprised of a first lens group with overall negative refracting power disposed coaxially imagewise relative to the field lens group, a second lens group with positive refracting power disposed coaxially relative to the first lens group, and an erecting lens group interposed coaxially between the first and second lens groups.

According to another aspect of the present invention, methods are provided for re-imaging a primary image produced by a prime lens at a primary image plane. Such methods comprise the steps of first routing the primary image from the primary image plane through an optical relay, and then relaying, using the optical relay, the primary image to form a positively demagnified secondary image at a secondary image plane. A key benefit is that the field angle of the prime lens is preserved. The method also can include the step of relaying the primary image to the secondary image plane by passing the primary image through a first lens group having overall negative power, an erecting lens group, and a second lens group with positive overall refracting power. More than one secondary image can be formed by including a beam-splitter or other such image-dividing means imagewise relative to the optical relay. Forming more than one secondary image can facilitate single-lens reflex operation of the prime lens.

The apparatus and methods have especial utility whenever a prime lens, designed for use with an older camera having a larger image sensor, needs to be adapted for use on a newer camera having a smaller image sensor while maintaining the same field angle of the prime lens.

BRIEF DESCRIPTION OF THE DRAWINGS

FIG. 3 is an optical diagram of the embodiment of Working Example 1;

FIG. 5 is an optical diagram of the embodiment of Working Example 2;

FIG. 7 is an optical diagram of the embodiment of Working Example 3;

FIG. 8A is a profile of spherical aberration for the embodiment of FIG. 7;

FIG. 8B is an astigmatism profile for the embodiment of FIG. 7;

FIG. 8C is a distortion profile of the embodiment of FIG. 7;

FIG. 8D is a profile of lateral chromatic aberration of the embodiment of FIG. 7;

FIG. 8E is a coma profile of the embodiment of FIG. 7;

DETAILED DESCRIPTION

Figure 1:
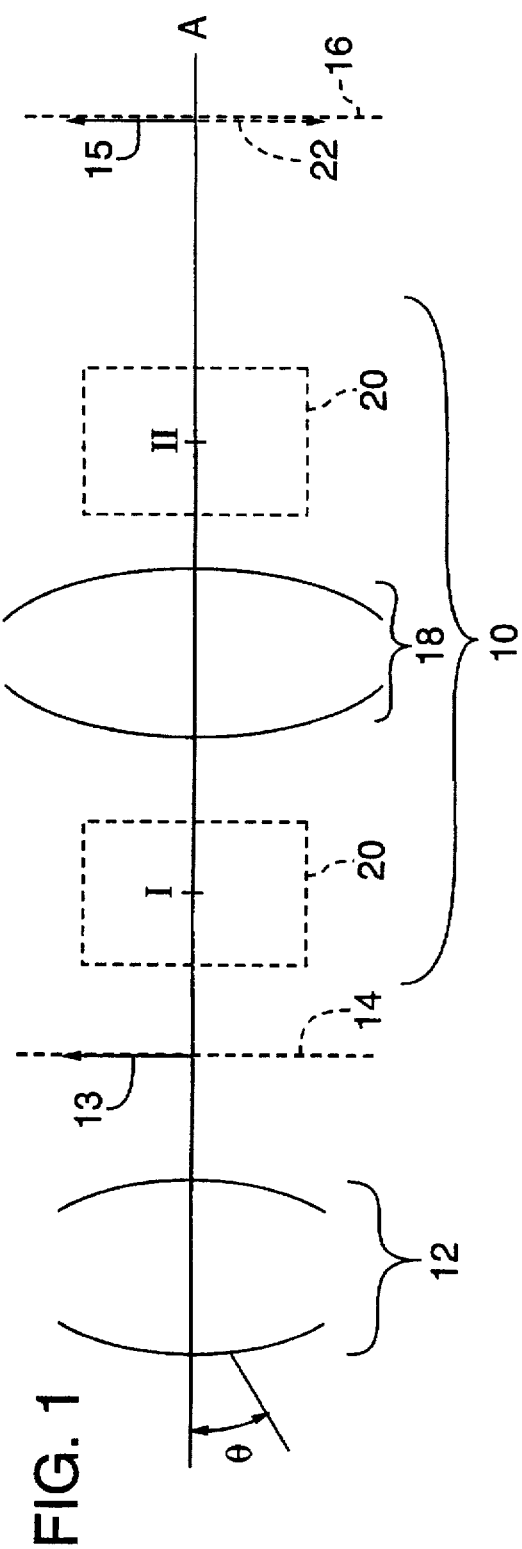
FIG. 1 is a general schematic diagram of a re-imaging optical system according to the present invention coupled to a prime lens as used in a television camera.

The following expressions, terms and conventions are used herein:

A "positive" distance or direction along an optical axis extends from left to right in an optical diagram; a "negative" distance or direction extends from right to left.

A "positive" elevation in an optical diagram extends upward from the optical axis; a "negative" elevation extends downward.

The "magnification" of a converter lens according to the present invention is a ratio of a secondary image height to a primary image height.

"Demagnification" is a magnification that results in a magnitude of secondary image height that is less than the magnitude of primary image height; i.e., a magnification between −1 and +1, exclusive.

"Positive demagnification" is a magnification that results in a magnitude of secondary image height that is less than the magnitude of primary image height, wherein the secondary image height and the primary image height have the same sign; i.e. the secondary image is not inverted relative to the primary image.

In an optical diagram, light travels from left to right, from the object to the image.

The "radius of curvature" of an optical surface (such as a surface of a lens element) is "positive" whenever the center of curvature lies to the right of the surface, and "negative" whenever the center of curvature lies to the left of the surface.

A "planar" optical surface has an infinite radius.

A "principal ray" is a ray from a point on the object that travels through the center of each of the entrance pupil, aperture stop, and exit pupil of an optical system.

The "field angle" (2θ) is twice the angle θ subtended by the principal ray and the optical axis, as measured at the entrance pupil, for the principal ray intersecting the image plane at the edge of the image field (i.e., the edge of the CCD array).

The "numerical aperture" ("NA") is given by n·sinø, wherein ø is the angle between the marginal ray and the optical axis, and n is the index of refraction of the medium in which the angle ø is measured.

The "clear aperture" is the diameter of a lens or aperture in an optical system.

The "back focus" ("$B_f$") is the axial distance between the most imagewise lens surface and the image.

The "primary image" is an image formed by the prime lens.

The "secondary image" is an image of the primary image formed at the secondary image plane.

The "Abbe number" ("$V_d$") is the ratio $(n_D-1)/(n_F-n_C)$, where $n_D$ is the index of refraction in D-line light (589.3 nanometer wavelength), $n_F$ is the index of refraction in F-line light (486.1 nanometer wavelength) and $n_c$ is the index of refraction in C-line light (656.3 nanometer wavelength).

The "e-line refractive index" ("$n_e$") is index of refraction in e-line light (546.1 nanometer wavelength).

A "principal point" is a point of intersection of the optical axis and a principal plane. The principal plane location is determined by first tracing paraxial rays through a lens element (or collection of lens elements) from the front (or rear) focal point, and then linearly extending the rays forward and backward from the first lens surface and the last lens surface, respectively, and noting where the rays intersect.

"$DB_f$" is the axial distance between the most imagewise principal point of the most imagewise lens system and the secondary image plane.

"Longitudinal chromatic aberration" is a measure of the difference in axial magnification between F-line light and C-line light, measured along the optical axis as a difference in focal position.

"Lateral chromatic aberration" is a measure of the difference in lateral magnification between F-line light and C-line light, measured at the image plane as an image-height difference between the F-line principal rays and the C-line principal rays.

The present invention is directed, inter alia, to methods and apparatus for re-imaging a primary image formed by a prime lens to form a secondary image corresponding substantially completely in scope to the primary image, but on a screen that is smaller than the screen for which the prime lens was designed. The secondary image is formed using a re-imaging optical system, termed a "converter" lens system.

FIG. 1 provides a general schematic diagram of a re-imaging optical system 10, according to the present invention, disposed in a positive direction (i.e., imagewise) along the optical axis A relative to a prime lens 12. The prime lens 12 produces a primary image 13 at a primary image plane 14, and the re-imaging optical system 10 produces a secondary image 15 at a secondary image plane 16. The re-imaging optical system 10 generally comprises a lens assembly 18 having a positive refracting power, and an erecting prism 20 that can be disposed either objectwise (position I in FIG. 1) or imagewise (position II in FIG. 1) relative to the lens assembly 18. By disposing the lens assembly 18 imagewise relative to the primary image 13, the re-imaging optical system 10 reduces the size of the primary image 13 while maintaining the field angle 2θ. Disposing the erecting prism 20 between the primary image plane 14 and the secondary image plane 16 prevents formation of an inverted secondary image 22.

If the erecting prism 20 is placed at location II between the lens assembly 18 and the secondary image plane 16, a long back focus can result, which can increase unacceptably the difficulty of obtaining certain demagnifications. Conversely, if the lens assembly 18 is configured so as to achieve a required demagnification, it can be unacceptably difficult to achieve a back focus sufficient to accommodate both the erecting prism 20 and a color-separating prism (not shown) necessary for single-lens reflex operation of the TV camera.

If the erecting prism 20 is placed at location I between the prime lens 12 and the lens assembly 18, the absence of a positive lens element to bend rays diverging from the primary image 13 requires the erecting prism 20 to have a large clear aperture in order to capture all the primary image-forming rays. This situation can prevent making the re-imaging optical system 10 compact.

Figure 2:
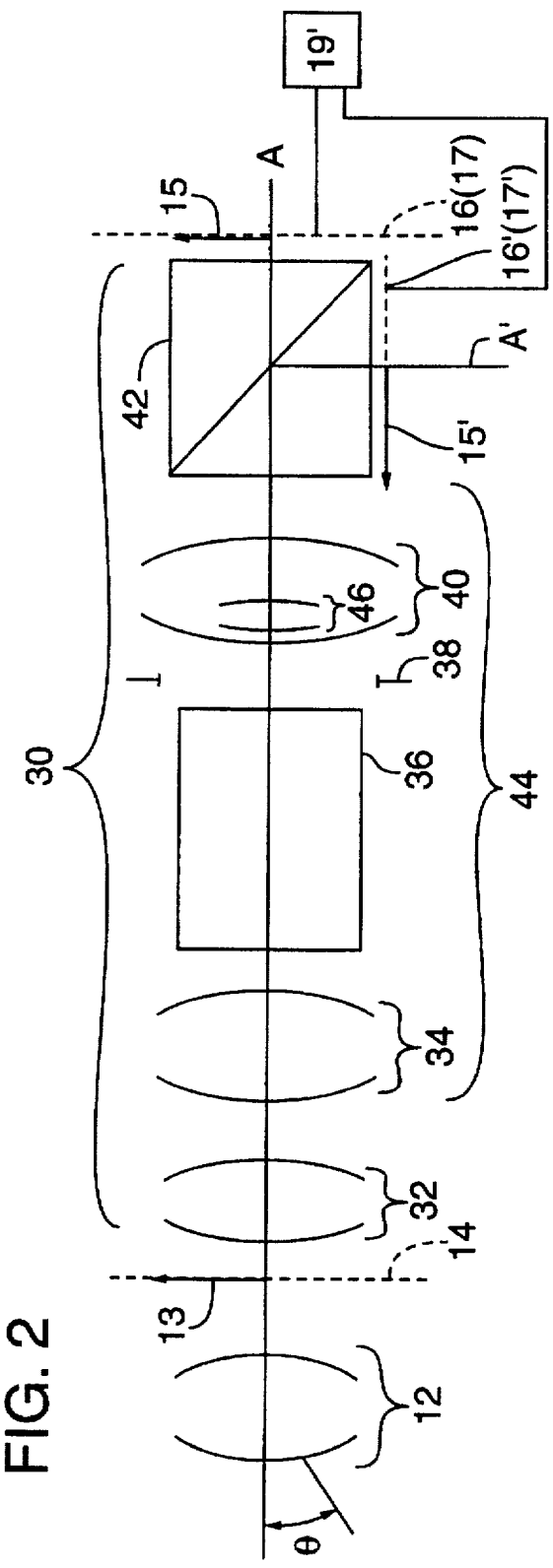
FIG. 2 is a general schematic diagram of a re-imaging optical system according to the present invention, similar to that shown in FIG. 1 but depicting more optical detail than FIG. 1.
Figure 4D:
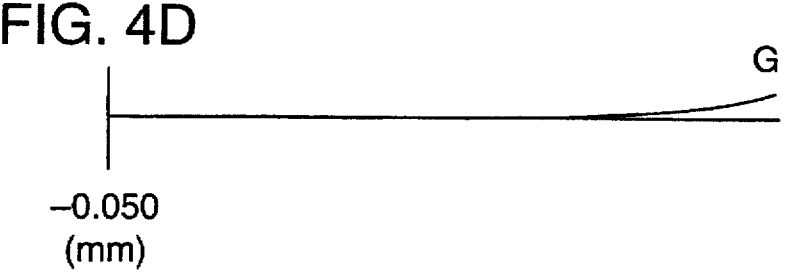
FIG. 4D is a profile of lateral chromatic aberration of the embodiment of FIG. 3.
Figure 4E:
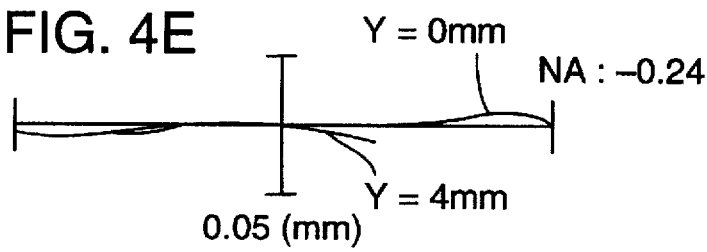
FIG. 4E is a coma profile of the embodiment of FIG. 3.
Figure 4A:
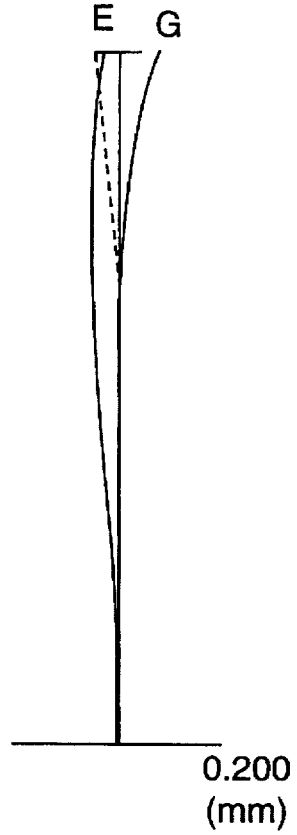
FIG. 4A is a spherical aberration profile of the embodiment of FIG. 3.
Figure 4B:
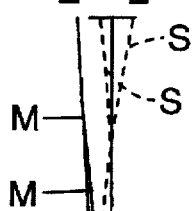
FIG. 4B is an astigmatism profile of the embodiment of FIG. 3.
Figure 4C:
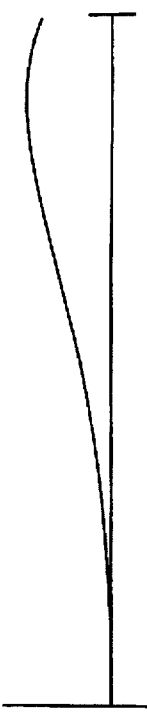
FIG. 4C is a distortion profile of the embodiment of FIG. 3.
Figure 6D:
FIG. 6D is a profile of lateral chromatic aberration of the embodiment of FIG. 5.
Figure 6E:
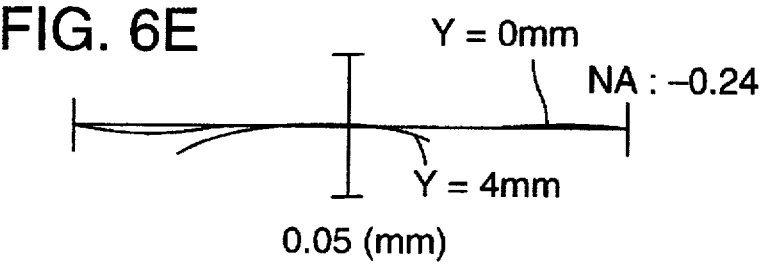
FIG. 6E is a coma profile of the embodiment of FIG. 5.
Figure 6A:
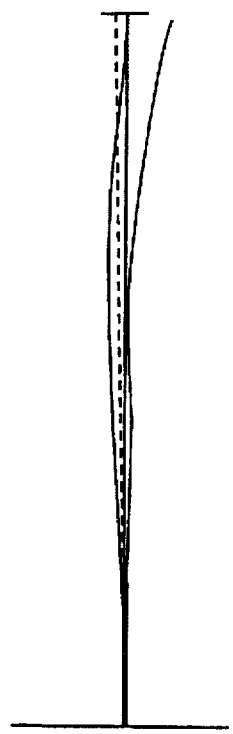
FIG. 6A is a profile of spherical aberration for the embodiment of FIG. 5.
Figure 6B:
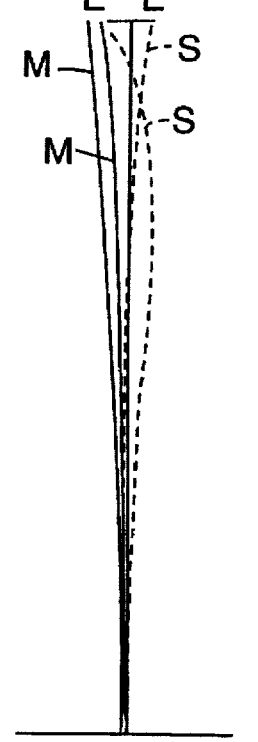
FIG. 6B is an astigmatism profile for the embodiment of FIG. 5.
Figure 6C:
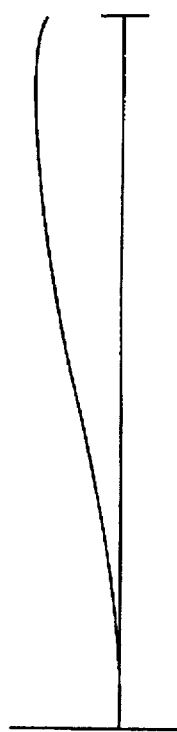
FIG. 6C is a distortion profile of the embodiment of FIG. 5.

FIG. 2 schematically illustrates another general embodiment of a re-imaging optical system 30 according to the present invention. (In FIG. 2, components that are the same as those shown in FIG. 1 are given the same reference designators.) Further with respect to FIG. 2, the re-imaging optical system 30 is disposed in a positive direction relative to a primary lens 12. The re-imaging optical system 30 comprises: a field lens group 32, a first (negative) lens group 34 having an overall negative refracting power, an erecting lens group 36, an aperture stop 38, a second (positive) lens group 40 having an overall positive refracting power, a color-separating prism 42 of other beam splitter, and a secondary image planes 16, 16'. An appropriate sensor 17, 17', such as a CCD, is situated at each secondary image plane 16, 16', respectively, to detect the respective secondary images 15, 15'. The sensors 17, 17' are connected to an image recorder 19 such as a videotape recorder. The negative lens group 34, the erecting lens group 36, the aperture stop 38, and the positive lens group 40 collectively comprise an "optical relay" 44. The field lens group 32, placed at or near the primary image plane 14 in an imagewise direction, directs primary image-forming principal rays toward the optical relay 44. The negative lens group 34 refracts principal rays so as to be as nearly parallel as possible with the optical axis A before the rays impinge on the erecting lens group 36. This, in turn, allows the clear aperture of the erecting lens group 36, employed for inverting the primary image 13, to be made sufficiently small for the re-imaging optical system to be regarded as "compact." The positive lens group 40, situated immediately imagewise relative to the erecting lens group 36, has a relatively strong positive refracting power in order to achieve a desired demagnification, typically about 0.2×. An optional color-separating prism 42 allows for single-lens reflex operation of the TV camera.

Several "preferred design conditions" preferably are met in order to obtain the best secondary imaging while also maintaining compactness of the re-imaging optical system according to the present invention. A first design condition involves balancing the brightness of the secondary image 15 with the overall length of the re-imaging optical system 30 (i.e, the distance along the optical axis A measured from the object-most surface of the field lens group 32 to the secondary image plane 16). The design condition is expressed as:

$$3 < |f_2/f_r| < 4 \qquad (1)$$

wherein $f_2$ is the focal length of the negative lens group 34 and $f_r$ is the overall focal length of the optical relay 44. As the refracting power of the negative lens group 34 is made smaller, the overall focal length of the re-imaging optical system 44 also becomes smaller. However, exceeding the lower limit of design condition (1) can cause rays leaving the negative lens group 34 to excessively diverge from the axis A. This necessitates making the clear aperture of the erecting lens group 36 undesirably large in order to maintain secondary image brightness consistent with a primary image-side NA of about 0.045. Conversely, exceeding the upper limit of design condition (1) is disadvantageous because the re-imaging optical system 30 would be overall excessively long, thereby adversely affecting compactness. Moreover, it is preferable that the lower limit of condition (1) be 0.7 for good correction of field curvature. It is also preferable that the upper limit of condition (1) be 0.8 for optional compactness of the optical relay.

A second "preferred design condition" relates to compactness and secondary image brightness and is expressed as:

$$0.2 < D/f_2 < 0.7 \tag{2}$$

wherein D is the distance along the optical axis A between the aperture stop 38 and the object-most lens surface of the positive lens group 40. Design condition (2) supports the aforementioned requirement that the exit pupil of the re-imaging optical system 30 be sufficiently far from the secondary image plane 16 such that principal rays forming the secondary image 15 are incident on the objectwise face of the color-separating prism 42 within a suitably narrow range of angles to avoid color shading. As D becomes larger, the re-imaging optical system 30 becomes more and more telecentric. As a result, incident angles of secondary-image principal rays on the surface of the color-separating prism 42 vary correspondingly less with secondary image height. If D were to exceed the upper threshold of design condition (2), the re-imaging optical system 30 would lose its compactness.

In order to place the exit pupil of the re-imaging optical system 30 sufficiently far from the secondary image plane 16 without increasing the overall length of the re-imaging optical system 30, a negative lens element 46 can be disposed within the positive lens group 40, preferably so as to be the most objectwise lens element in the positive lens group 40. The negative lens element 46 preferably is shaped so as to provide satisfactory correction of coma and distortion. Coma and distortion are corrected best when the lens element 46 has a meniscus configuration and satisfies a third "preferred design condition":

$$2 < (r_1 + r_2)/(r_1 - r_2) < 50 \tag{3}$$

wherein $r_1$ and $r_2$ are the radii of curvature of the objectwise and imagewise surfaces, respectively, of the negative lens element 46.

In order to achieve a desired amount of demagnification while maintaining the field angle 2θ of the prime lens 12 as well as adequate back focus, a fourth "preferred design condition" is preferably satisfied:

$$0.5 < |f_3|/DB_f < 1.0 \tag{4}$$

wherein $f_3$ is the focal length of the positive lens group 40, and $DB_f$ is the distance along the optical axis A between the principal point (not shown) of the positive lens group 40 and the secondary image plane 16. Satisfying design condition (4) achieves a desirable balance between demagnification and back focus. As mentioned above, the positive refracting power of the positive lens group 40 must be relatively strong to achieve a demagnification of about 0.2×. However, if the positive refracting power of the positive lens group 40 were to be so strong as to yield a value of $|f_3|/DB_f$ less than the lower limit of design condition (4), then adequate back focus would not be obtainable. On the other hand, were the positive refracting power of the positive lens group 40 to be so weak that the upper limit of design condition (4) is exceeded, then the positive lens group 40 would be unable to de-magnify the primary image 13 to a desired extent.

Yet further improved secondary imaging performance can be achieved whenever the negative lens group 34 and the positive lens group 40 satisfy the following additional "preferred design conditions" relating to the Abbe number $V_d$ and the index of refraction, $n_e$:

$$V_d > 45 \tag{5}$$

$$n_e > 1.7 \tag{6}$$

Design condition (5) pertains to controlling chromatic aberration and provides a preferred range for the Abbe numbers of all lens elements in the negative lens group 34 having negative refracting power. Exceeding the limit of design condition (5) disadvantageously causes maintaining a balance between longitudinal and lateral chromatic aberration to become excessively difficult. Design condition (6) pertains to controlling field curvature and provides a preferred range for the refractive indices $n_e$ of all lens elements in the negative lens group 34 having positive refracting power, and of at least one lens element in the positive lens group 40 having positive refracting power. I.e., according to design condition (6), lens elements in the optical relay having positive refracting power preferably are made using glasses having high indices of refraction. Falling below the limit of design condition (6) would be disadvantageous because correction of field curvature introduced by the field lens group 32 would be excessively difficult.

WORKING EXAMPLES

The following Working Examples 1–4 pertain to re-imaging optical systems according to the present invention each of which comprising (see FIG. 2), in sequence objectwise to imagewise, the following components: a field lens group 32, a negative lens group 34 having an overall negative refracting power, an erecting lens group 36, and a positive lens group 40 having an overall positive refracting power. A color-separating prism 42 situated imagewise relative to the optical relay 44 can be used, inter alia, for correcting aberrations. The negative and positive lens groups 34, 40, respectively, together comprise an optical relay 44 having an overall positive refracting power.

Working Examples 1–4 are explained with reference to schematic diagrams as shown in FIGS. 3, 5, 7, and 9, together with accompanying Tables 1, 2, 3, and 4, respectively, listing certain key parameters of the respective re-imaging optical system and lens elements thereof. In Tables 1–4, magnification is determined at an "e"-line wavelength of 541.6 nanometers.

In addition, in each Working Examples 1–4, the NA of the respective image-forming optical system is an expression of the NA of the primary image side of the re-imaging optical system. The position of the exit pupil is determined from the secondary image plane 16, objectwise to imagewise. Thus, an exit-pupil position bearing a negative sign indicates that the exit pupil is objectwise of the secondary image plane 16. Lens surfaces are numbered objectwise to imagewise, beginning with the objectwise surface of the first lens element in the field lens group 32. Finally, the variable "d" represents the distance along the optical axis between adjacent surfaces.

In FIGS. 4A–4E, 6A–6E, 8A–8E, and 10A–10E depicting aberration plots of corresponding re-imaging optical systems, "NA" represents the numerical aperture of the secondary image side, "Y" is the secondary image height, "E" represents the e-line wavelength, and "G" represents the g-line wavelength of 435.8 nm. In FIGS. 4B, 6B, 8B, and 10B showing aberration plots for astigmatism, the solid line "S" represents the sagittal image surface and the broken line "M" represents the meridional image surface. In FIGS. 4A, 6A, 8A, and 10A showing spherical aberration plots, the broken line is a plot of the sine condition. In FIGS. 4E, 6E, 8E, and 10E showing aberration plots for coma, the e-line wavelength is the reference wavelength.

Working Example 1

With respect to this Working Example, an optical diagram of the re-imaging optical system 60 is shown in FIG. 3, comprising a field lens group 62, and an optical relay 64. A color-separating prism 66 is provided as required. The optical relay 64 comprises a negative lens group 68, an erecting prism 70, and a positive lens group 72. The field lens group 62 comprises a convex lens element 74 having an imagewise convex surface 78, and a positive meniscus lens element 80 having an objectwise convex surface 82. The negative lens group 68 comprises a negative meniscus lens element 86 having a convex surface 88 oriented objectwise, and a compound lens 92 comprised of a bi-concave lens element 94 and a bi-convex lens element 96. The erecting prism 70 has two opposing planar surfaces 104 and 106. The positive lens group 72 comprises a negative meniscus lens element 108 having an objectwise convex surface 110, a compound lens 114 (comprised of a negative meniscus lens element 116 having an objectwise convex surface 118 and a bi-convex lens element 122), and a bi-convex lens element 126. The color-separating prism 66 comprises three planar surfaces 132, 134, and 136.

Various optical parameters are listed in Table 1, below.

TABLE 1

Magnification = −0.1848
Primary image-side NA = 0.0452
Exit pupil position = −177 mm

| surface | r | d | $n_e$ | $v_d$ |
|---|---|---|---|---|
| 76 | ∞ | 5.400 | 1.90864 | 35.72 |
| 78 | −62.963 | 0.100 | | |
| 82 | 39.298 | 6.200 | 1.90864 | 35.72 |
| 84 | 145.681 | 37.579 | | |
| 88 | 92.089 | 0.900 | 1.50349 | 56.41 |
| 90 | 11.637 | 3.600 | | |
| 98 | −26.027 | 0.900 | 1.52040 | 60.23 |
| 100 | 19.554 | 3.300 | 1.90864 | 35.72 |
| 102 | −94.606 | 0.600 | | |
| 104 | ∞ | 76.620 | 1.57125 | 56.05 |
| 106 | ∞ | 0.900 | | |
| 107 | ∞ | 13.151 | (aperture stop) | |
| 110 | 67.878 | 1.500 | 1.67765 | 32.17 |
| 112 | 36.476 | 3.500 | | |
| 118 | 48.958 | 1.200 | 1.81267 | 25.35 |
| 120 | 29.138 | 4.200 | 1.49926 | 82.52 |
| 124 | −46.387 | 2.700 | | |
| 128 | 36.103 | 3.000 | 1.75151 | 52.30 |
| 130 | −131.562 | 1.971 | | |
| 132 | ∞ | 11.000 | 1.51872 | 64.10 |
| 135 | ∞ | 29.000 | 1.60718 | 38.03 |
| 136 | ∞ | | | |

In Table 1, values corresponding to the preferred design conditions and other variables are:

$f_2 = -39.57$ $f_r = 12.09$ $f_3 = 28.75$ $DB_f = 39.99$ $D = 13.15$ (1) $|f_2/f_r| = 3.27$ (2) $|D/f_2| = 0.33$ (3) $(r_1 + r_2)/(r_1 - r_2) = 3.32$ (4) $|f_3/DB_f| = 0.72$ (5) $V_d(\text{lens } 86) = 56.41$ $V_d(\text{lens } 94) = 60.23$ (6) $n_e(\text{lens } 96) = 1.90864$ $n_e(\text{lens } 126) = 1.75151$ FIGS. 4A–4E show plots for spherical aberration, astigmatism, distortion, lateral chromatic aberration, and coma, respectively, for this Working Example. As is clear from these plots, the configuration of this Working Example is well-corrected for aberrations and is suitable for achieving the objectives of the present invention.

Working Example 2

With respect to this Working Example, an optical diagram of the re-imaging optical system 160 is shown in FIG. 5, comprising a field lens group 162, and an optical relay 164. A color-separating prism 166 is provided as required. The optical relay 164 comprises a negative lens group 168, an erecting prism 170, and a positive lens group 172. The field lens group 162 comprises a convex lens element 174 having an imagewise convex surface 178, and a positive meniscus lens element 180 having an objectwise convex surface 182. The negative lens group 168 comprises a negative meniscus lens element 186 having a convex surface 188 oriented objectwise, and a compound lens 192 comprised of a bi-concave lens element 194 and a bi-convex lens element 196. The erecting prism 170 has two opposing planar surfaces 204 and 206. The positive lens group 172 comprises a negative meniscus lens element 208 having an objectwise convex surface 210, a biconvex lens element 222, and a biconvex lens element 226. The color-separating prism 166 comprises three planar surfaces 232, 234, and 236.

Various optical parameters are listed in Table 2, below.

TABLE 2

Magnification = −0.184
Primary image-side NA = 0.0453
Exit pupil position = −267 mm

| surface | r | d | $n_e$ | $v_d$ |
|---|---|---|---|---|
| 176 | ∞ | 5.200 | 1.90864 | 35.72 |
| 178 | −161.61368 | 0.100 | | |
| 182 | 39.72515 | 5.600 | 1.09864 | 35.72 |
| 184 | 132.04733 | 38.703 | | |
| 188 | 184.45498 | 1.000 | 1.51679 | 54.55 |
| 190 | 13.34484 | 3.500 | | |
| 198 | −33.71448 | 1.000 | 1.52040 | 60.23 |
| 200 | 22.53874 | 3.000 | 1.90864 | 35.72 |
| 202 | −111.28264 | 0.700 | | |
| 204 | ∞ | 76.620 | 1.57125 | 56.05 |
| 206 | ∞ | 2.920 | | |
| 207 | ∞ | 19.908 | (aperture stop) | |
| 210 | 63.21907 | 1.200 | 1.81267 | 25.35 |
| 212 | 27.11073 | 1.000 | | |
| 220 | 28.52426 | 3.800 | 1.49926 | 82.52 |
| 224 | −43.70318 | 2.700 | | |
| 228 | 37.18757 | 2.200 | 1.79192 | 47.47 |
| 230 | −815.63911 | 2.900 | | |
| 232 | ∞ | 11.000 | 1.51872 | 64.10 |

TABLE 2-continued

Magnification = −0.184
Primary image-side NA = 0.0453
Exit pupil position = −267 mm

| surface | r | d | $n_e$ | $v_d$ |
|---|---|---|---|---|
| 234 | ∞ | 29.000 | 1.60718 | 38.03 |
| 236 | ∞ | | | |

In Table 2, values corresponding to the preferred design conditions and other variables are:

$f_2 = -42.82$ $f_r = 12.53$ $f_3 = 29.50$ $D = 19.91$ $DB_f = 40.65$ (1) $|f_2/f_r| = 3.42$ (2) $|D/f_2| = 0.46$ (3) $(r_1 + r_2)/(r_1 - r_2) = 2.50$ (4) $|f_3/DB_f| = 0.73$ (5) $V_d$(lens 186) = 54.55

$V_d$(lens 194) = 60.23
(6) $n_e$(lens 196) = 1.90864

$n_e$(lens 226) = 1.79192

FIGS. 6A–6E show plots for spherical aberration, astigmatism, distortion, lateral chromatic aberration, and coma, respectively, for this Working Example. As is clear from these plots, the configuration of this Working Example is well-corrected for aberrations and is suitable for achieving the objectives of the present invention.

Working Example 3

With respect to this Working Example, an optical diagram of re-imaging optical system 260 is shown in FIG. 7, comprising a field lens group 262, and an optical relay 264. A color-separating prism 266 is provided as required. The optical relay 264 comprises a negative lens group 268, an erecting prism 270, and a positive lens group 272. The field lens group 262 comprises a convex lens element 274 having an imagewise convex surface 278, and a positive meniscus lens element 280 having an objectwise convex surface 282. The negative lens group 268 comprises a negative meniscus lens element 286 having a convex surface 288 oriented objectwise, and a compound lens 292 comprised of a bi-concave lens element 294 and a bi-convex lens element 296. The erecting prism 270 has two opposing planar surfaces 304 and 306. The positive lens group 272 comprises a negative meniscus lens element 308 having an objectwise convex surface 310, a compound lens 314 (comprised of a negative meniscus lens element 316 having an objectwise convex surface 318 and a bi-convex lens element 322), and a bi-convex lens element 326. The color-separating prism 266 comprises three planar surfaces 332, 334, and 336.

Various optical parameters are listed in Table 3, below.

TABLE 3

Magnification = −0.184
Primary image-side NA = 0.04534
Exit pupil position = +2881 mm

| surface | r | d | $n_e$ | $v_d$ |
|---|---|---|---|---|
| 276 | ∞ | 5.400 | 1.90864 | 35.72 |
| 278 | −62.96342 | 0.100 | | |
| 282 | 39.29801 | 6.2300 | 1.90864 | 35.72 |
| 284 | 145.68096 | 37.949 | | |
| 288 | 160.09785 | 0.900 | 1.50349 | 56.41 |
| 290 | 11.78913 | 3.600 | | |
| 298 | −25.46913 | 0.900 | 1.50349 | 56.41 |
| 300 | 19.55444 | 3.300 | 1.90864 | 35.72 |
| 302 | −89.97775 | 0.600 | | |
| 304 | ∞ | 76.620 | 1.57125 | 56.05 |
| 306 | ∞ | 0.900 | | |
| 307 | ∞ | 22.100 | (aperture stop) | |
| 310 | 43.65620 | 1.500 | 1.67765 | 32.17 |
| 312 | 40.75729 | 3.500 | | |
| 318 | 58.45638 | 1.200 | 1.81267 | 25.35 |
| 320 | 29.62691 | 4.200 | 1.49926 | 82.52 |
| 324 | −47.20423 | 2.700 | | |
| 328 | 34.13319 | 3.000 | 1.75151 | 52.30 |
| 330 | 663.15356 | 4.900 | | |
| 332 | ∞ | 11.000 | 1.51872 | 64.10 |
| 334 | ∞ | 29.000 | 1.60718 | 38.03 |
| 336 | ∞ | | | |

In Table 3, values corresponding to the preferred design conditions and other variables are:

$f_2 = -39.87$ $f_r = 12.26$ $f_3 = 30.79$ $D = 22.10$ $DB_f = 42.74$ (1) $|f_2/f_r| = 3.25$ (2) $|D/f_2| = 0.55$ (3) $(r_1 + r_2)/(r_1 - r_2) = 29.119$ (4) $|f_3/DB_f| = 0.72$ (5) $V_d$(lens 286) = 56.41

$V_d$(lens 294) = 56.41
(6) $n_e$(lens 296) = 1.90864

$n_e$(lens 326) = 1.75151

FIGS. 8A–8E show plots for spherical aberration, astigmatism, distortion, lateral chromatic aberration, and coma, respectively, for this Working Example. As is clear from these plots, the configuration of this Working Example is well-corrected for aberrations and is suitable for achieving the objectives of the present invention.

Working Example 4

Figure 9:
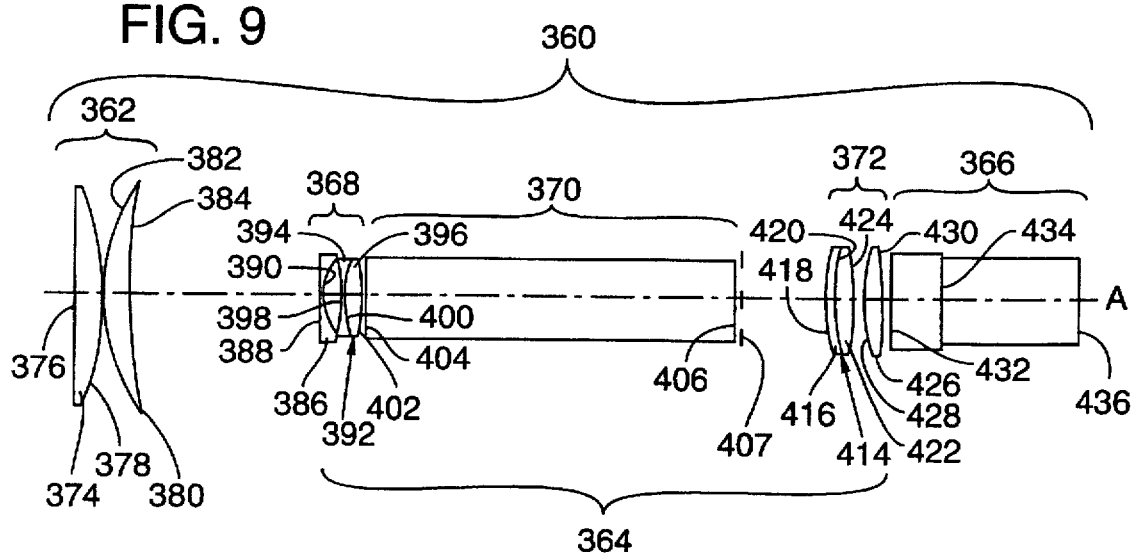
FIG. 9 is an optical diagram of the embodiment of Working Example 4.
Figure 10D:
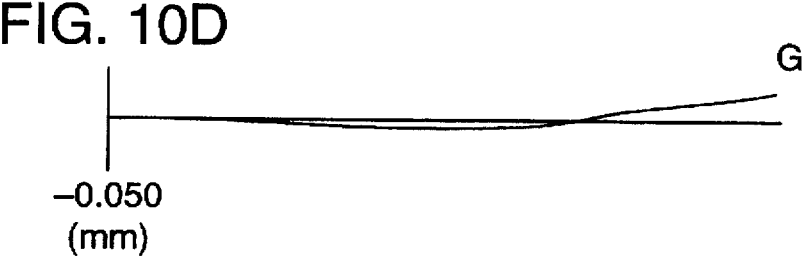
FIG. 10D is a profile of lateral chromatic aberration of the embodiment of FIG. 9.
Figure 10E:
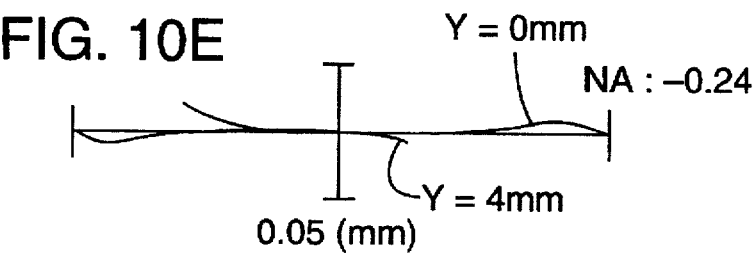
FIG. 10E is a coma profile of the embodiment of FIG. 9.
Figure 10A:
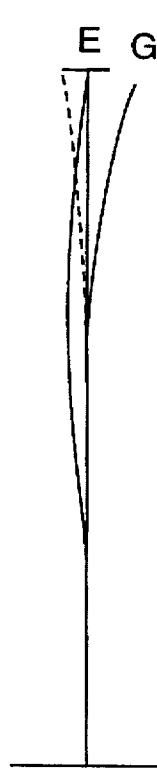
FIG. 10A is a profile of spherical aberration for the embodiment of FIG. 9.
Figure 10B:
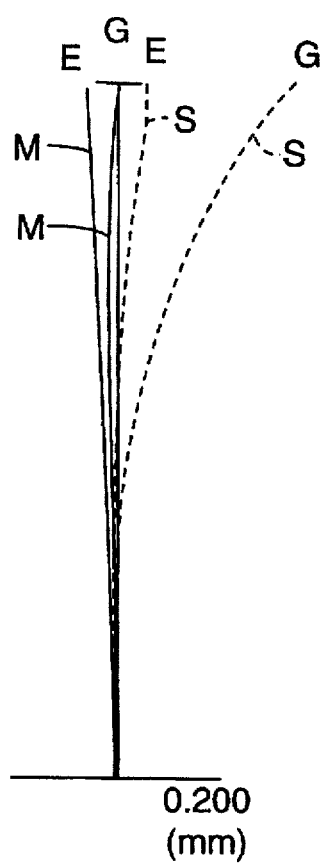
FIG. 10B is an astigmatism profile for the embodiment of FIG. 9.
Figure 10C:
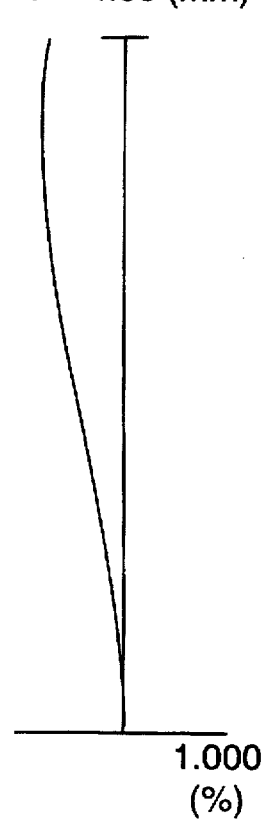
FIG. 10C is a distortion profile of the embodiment of FIG. 9.

With respect to this Working Example, an optical diagram of re-imaging optical system 360 is shown in FIG. 9, comprising a field lens group 362 and an optical relay 364. A color-separating prism 366 is provided as required. The optical relay 364 comprises a negative lens group 368, an erecting prism 370, and a positive lens group 372. The field lens group 362 comprises a convex lens element 374 having an imagewise convex surface 378, and a positive meniscus lens element 380 having an objectwise convex surface 382. The negative lens group 368 comprises a negative meniscus lens element 386 having a convex surface 388 oriented objectwise, and a compound lens 392 comprised of a bi-concave lens element 394 and a bi-convex lens element 396. The erecting prism 370 has two opposing planar surfaces 404 and 406. The positive lens group 372 comprises a compound lens 414 (comprised of a negative meniscus lens element 416 having an objectwise convex surface 418 and a bi-convex lens element 422), and a bi-convex lens element 426. The color-separating prism 366 comprises three planar surfaces 432, 434, and 436.

Various optical parameters are listed in Table 4, below.

TABLE 4

Magnification = −0.184
Primary image-side NA = 0.04559
Exit pupil position = +1415 mm

| surface | r | d | $n_e$ | $v_d$ |
|---|---|---|---|---|
| 376 | ∞ | 5.200 | 1.90864 | 35.72 |
| 378 | −60.66063 | 0.100 | | |
| 382 | 39.77479 | 5.600 | 1.90864 | 35.72 |
| 384 | 132.04737 | 38.642 | | |
| 388 | 152.54243 | 1.000 | 1.53430 | 48.97 |
| 390 | 13.77192 | 3.500 | | |
| 398 | −36.28392 | 1.000 | 1.52040 | 60.23 |
| 400 | 22.53874 | 3.000 | 1.90864 | 35.72 |
| 402 | −129.54592 | 0.700 | | |
| 404 | ∞ | 76.620 | 1.57125 | 56.05 |
| 406 | ∞ | 2.900 | | |
| 407 | ∞ | 27.205 | (aperture stop) | |
| 418 | 72.00194 | 1.200 | 1.81267 | 25.35 |
| 420 | 31.11633 | 3.800 | 1.49926 | 82.52 |
| 424 | −40.35496 | 2.700 | | |
| 428 | 32.46652 | 2.200 | 1.80822 | 46.55 |
| 430 | 154.56008 | 4.897 | | |
| 432 | ∞ | 11.000 | 1.51872 | 64.10 |
| 434 | ∞ | 29.000 | 1.60718 | 38.03 |
| 436 | ∞ | | | |

In Table 4, values corresponding to the preferred design conditions and other variables are:

$f_2 = -43.58$
$f_r = 12.69$
$f_3 = 30.78$
$D = 27.21$
$DB_f = 42.28$
(1) $|f_2/f_r| = 3.43$
(2) $|D/f_2| = 0.62$
(3) $(r_1 + r_2)/(r_1 - r_2) = 2.52$
(4) $|f_3/DB_f| = 0.73$
(5) $V_d(\text{lens } 386) = 48.97$
$V_d(\text{lens } 394) = 60.23$
(6) $n_e(\text{lens } 396) = 1.90864$
$n_e(\text{lens } 426) = 1.80822$ FIGS. 10A–10E show plots for spherical aberration, astigmatism, distortion, lateral chromatic aberration, and coma, respectively, for this Working Example. As is clear from these plots, the configuration of this Working Example is well-corrected for aberrations and is suitable for achieving the objectives of the present invention.

As described hereinabove, the re-imaging optical systems and methods for re-imaging a primary image formed by a prime lens provides for positive demagnification of the primary image to form a secondary image, while simultaneously providing adequate back focus (to accommodate, e.g., a color-separating prism or other single-lens reflex component), maintaining the field angle of the prime lens, and minimizing color shading. Satisfying the prescribed conditions results in a secondary image that is bright and well-corrected for aberrations. Satisfying the prescribed conditions also allows for the exit pupil of the re-imaging optical system to be adequately distanced from the second-ary image plane so as to avoid color shading, while also minimizing the overall length of the optical system. Consequently, re-imaging optical systems according to the present invention are compact and provide excellent imaging performance.

It will be appreciated that a re-imaging optical system according to the present invention can be employed with a prime lens whenever it is desired to produce, on a secondary image plane disposed imagewise relative to a primary image plane, an image smaller than but having the same scope as the image produced by the prime lens on the primary image plane, without sacrificing the field angle of the prime lens and while providing an adequate back focus to permit use of a beam splitter or other single-lens-reflex component as required.

While the present invention has been described in connection with preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. A re-imaging optical system for use with a prime lens having a field angle and capable of forming a primary image on a primary image plane, the re-imaging optical system comprising:

(a) a field lens group adapted to be disposed coaxially imagewise relative to the primary image plane; and
   (b) an optical relay disposed coaxially imagewise relative to the field lens group, the optical relay being operable to transfer and positively demagnify substantially the entire primary image from the primary image plane to a secondary image plane situated imagewise relative to the optical relay, without reducing the field angle of the prime lens, the optical relay comprising (i) a first lens group disposed coaxially imagewise of the field lens group, the first lens group having a negative refracting power and a focal length $f_2$; (ii) a second lens group disposed coaxially imagewise of the first lens group, the second lens group having a positive refracting power and a focal length $f_3$; and (iii) an erecting lens group interposed coaxially between the first and second lens groups; the optical relay having a focal length $f_r$, wherein $3 < |f_2/f_r| < 4$.

2. A re-imaging optical system according to claim 1, wherein the erecting lens group comprises an erecting prism.

3. A re-imaging optical system according to claim 1, further comprising a beam-splitter disposed coaxially objectwise relative to the secondary image plane, the beam-splitter serving to form multiple images from the secondary image.

4. A re-imaging optical system according to claim 3, wherein the beam-splitter comprises a prism.

5. A re-imaging optical system according to claim 1, wherein the second lens group comprises a negative meniscus lens element disposed as the most objectwise lens element in the second lens group, the negative meniscus lens element having an objectwise surface and an imagewise surface each having a radius of curvature of $r_1$ and $r_2$, respectively, wherein $2 < (r_1 + r_2)/(r_1 - r_2) < 50$.

6. A re-imaging optical group according to claim 1, wherein the first lens group comprises a lens element having negative refracting power.

7. A re-imaging optical system according to claim 1, wherein at least one of the first and second lens groups comprises a lens element having positive refractive power and a refractive index $n_e$, wherein $n_e > 1.7$.

8. A re-imaging optical system according to claim 7, wherein the second lens group comprises a negative meniscus lens element disposed as the most objectwise lens element in the second lens group, the negative meniscus lens element having an objectwise surface and an imagewise surface each having a radius of curvature of $r_1$ and $r_2$, respectively, wherein $2 < (r_1 + r_2)/(r_1 - R_2) < 50$.

9. A re-imaging optical system according to claim 8, wherein the first lens group comprises a lens element having negative refracting power and an Abbe number $V_d$, wherein $V_d > 45$.

10. A re-imaging optical system according to claim 1, further comprising an aperture stop disposed between the erecting lens group and the second lens group.

11. A re-imaging optical system according to claim 10, wherein the aperture stop is disposed a distance D from an objectwise surface of a lens element in the second lens group nearest the aperture stop, wherein $0.2 < |D/f_2| < 0.7$.

12. A re-imaging optical system according to claim 11, wherein:

(a) the second lens group comprises a negative meniscus lens element disposed as the most objectwise lens element in the second lens group, the negative meniscus lens element having an objectwise surface and an imagewise surface each having a radius of curvature of $r_1$ and $r_2$, respectively, wherein: $2 < (r_1 + r_2)/(r_1 - r_2) < 50$;

(b) the first lens group comprises a lens element having negative refracting power and an Abbe number $V_d$ satisfying the condition: $V_d > 45$; and (c) at least one of the first and second lens groups comprises a lens element having positive refractive power and a refractive index $n_e$ satisfying the condition: $n_e > 1.7$.

13. A re-imaging optical system according to claim 1, wherein the second lens group has a principal point separated from the secondary image plane by a distance $DB_f$, wherein $0.5 < |f_3/DB_f| < 1.0$.

14. A re-imaging optical system according to claim 13, further comprising an aperture stop disposed between the erecting lens group and the second lens group, wherein:

(a) the second lens group comprises a negative meniscus lens element disposed as the most objectwise lens element in the second lens group, the negative meniscus lens element having an objectwise surface and an imagewise surface each having a radius of curvature of $r_1$ and $r_2$, respectively, wherein: $2 < (r_1 + r_2)/(r_1 - r_2) < 50$;

(b) the first lens group comprises a lens element having negative refracting power and an Abbe number $V_d$ satisfying the condition: $V_d > 45$;

(c) at least one of the first and second lens groups comprises a lens element having positive refractive power and a refractive index $n_e$ satisfying the condition: $n_e > 1.7$; and (d) the aperture stop is disposed a distance D from an objectwise surface of a lens element in the second group nearest the aperture stop, wherein $0.2 < |D/f_2| < 0.7$.

15. A lens assembly, comprising:

(a) a prime lens; and (b) the re-imaging optical system of claim 1 disposed coaxially imagewise relative to the prime lens.

16. A lens assembly according to claim 15, further comprising a light-sensor disposed at or near the secondary image plane, to sense the secondary image.

17. A lens assembly according to claim 16, further comprising an image recorder connected to the light-sensor secondary image.

18. A lens assembly according to claim 15, further comprising a beam-splitter disposed coaxially imagewise relative to the re-imaging optical system.

19. A re-imaging optical system for use with a prime lens having a field angle and capable of forming a primary image on a primary image plane, the re-imaging optical system comprising:

(a) a field lens group adapted to be disposed coaxially imagewise relative to the primary image plane; and (b) an optical relay disposed coaxially imagewise relative to the field lens group, the optical relay being operative to transfer and positively demagnify substantially the entire primary image from the primary image plane to a secondary image plane situated imagewise relative to the optical relay, without reducing the field angle of the prime lens, the optical relay comprising (i) a first lens group disposed coaxially imagewise of the field lens group, the first lens group having a negative refracting power and a focal length $f_2$, each lens element in the first lens group having negative refractive power having an Abbe number $V_d > 45$; (ii) a second lens group disposed coaxially imagewise of the first lens group, the second lens group having a positive refracting power and a focal length $f_3$, and comprising a negative meniscus lens element disposed as the most objectwise lens element in the second lens group, the negative meniscus lens element having an objectwise surface and an imagewise surface each having a radius of curvature of $r_1$ and $r_2$, respectively, wherein $2 < (r_1 + r_2)/(r_1 - r_2) < 50$; and (iii) an erecting lens group interposed coaxially between the first and second lens groups.

20. An apparatus for re-imaging a primary image, the primary image being produced at a primary image plane by a prime lens having a field angle, the apparatus comprising:

(a) a field lens group situated coaxially imagewise of the primary image plane;

(b) a negative lens group having a focal length $f_2$ situated coaxially imagewise of the field lens group and comprising a negative lens element having an Abbe number $V_d > 45$;

(c) an erecting lens group situated coaxially imagewise of the negative lens group;

(d) a positive lens group situated coaxially imagewise of the erecting lens group, the positive lens group having a focal length $f_3$ and comprising a negative meniscus lens element disposed as the most objectwise lens element in the positive lens group, the negative meniscus lens element having an objectwise surface and an imagewise surface having a radius of curvature of $r_1$ and $r_2$, respectively, wherein $2 < (r_1 + r_2)/(r_1 - r_2) < 50$, the positive lens group having a principal point separated from the secondary image plane by a distance $DB_f$, wherein $0.5 < |f_3/DB_f| < 1.0$;

(e) an aperture stop situated coaxially between the erecting lens group and the positive lens group at a distance D from an objectwise surface of a lens element in the positive lens group nearest the aperture stop, wherein $0.2 < |D/f_2| < 0.7$;

(f) at least one of the positive and negative lens groups comprising a positive lens element having a refractive index $n_c$ satisfying the condition: $n_c > 1.7$;

(g) the negative lens group, the erecting lens group and the positive lens group collectively comprising an optical relay adapted to transfer and positively demagnify substantially the entire primary image from the primary image plane to form a secondary image on a secondary image plane, situated imagewise relative to the positive lens group, without reducing the field angle of the prime lens, the optical relay having a focal length $f_r$ satisfying the condition $3 < |f_2/f_r| < 4$; and (h) a beam splitter disposed coaxially imagewise relative to the positive lens group, the beam splitter serving to conduct the secondary image along multiple pathways to form multiple secondary images at multiple secondary image planes.

21. A lens assembly, comprising:

(a) a prime lens; and (b) the apparatus of claim 20 disposed coaxially imagewise relative to the prime lens.

22. A lens assembly according to claim 21, further comprising a multiplicity of light sensors each disposed coaxially imagewise from the beam-splitter at or near a secondary image plane to sense a secondary image.

23. A lens assembly according to claim 22, further comprising an image recorder connected to the light sensors to record the sensed secondary images.

24. An apparatus adapted to be disposed coaxially imagewise relative to a prime lens for re-imaging a primary image produced at a primary image plane by the prime lens, the prime lens having a field angle, the apparatus comprising:

(a) a field lens group;

(b) a negative lens group situated coaxially imagewise of the field lens group, the negative lens group having a focal length $f_2$;

(c) an erecting prism situated coaxially imagewise of the negative lens group;

(d) an aperture stop situated coaxially imagewise of the erecting prism;

(e) a positive lens group situated coaxially imagewise of the aperture stop and having a focal length $f_3$, the positive lens group comprising a negative meniscus lens element situated as the most imagewise lens element in the positive lens group, the negative meniscus lens element having an objectwise surface and an imagewise surface each having a radius of curvature of $r_1$ and $r_2$, respectively, wherein $2 < (r_1+r_2)/(r_1-r_2) < 50$;

(f) the negative lens group, the erecting prism, the aperture stop, and the positive lens group being collectively operable as an optical relay for transferring and positively demagnifying substantially the entire primary image from the primary image plane so as to form a secondary image on a secondary image plane, situated imagewise relative to the positive lens group, without substantially reducing the field angle of the prime lens, the optical relay having a focal length $f_r$, wherein $3 < |f_2/f_r| < 4$.

25. An apparatus according to claim 24, further comprising a beam splitter disposed coaxially imagewise relative to the positive lens group, the beam splitter serving to conduct the secondary image along multiple pathways from the secondary image plane.

26. An apparatus according to claim 24, wherein the negative lens group comprises a lens element having negative refracting power and an Abbe number $V_d$, wherein $V_d > 45$.

27. An apparatus according to claim 26, wherein at least one of the negative and positive lens groups comprises a lens element having positive refractive power and a refractive index $n_e$, wherein $n_e > 1.7$.

28. An apparatus according to claim 27, wherein the aperture stop is disposed a distance D from an objectwise surface of a lens element in the negative lens group nearest the aperture stop, wherein $0.2 < |D/f_2| < 0.7$.

29. An apparatus according to claim 28, wherein the positive lens group has a principal point separated from the secondary image plane by a distance $DB_r$, wherein $0.5 < |f_3/DB_r| < 1.0$.

30. A lens assembly, comprising:

(a) a prime lens; and (b) the apparatus of claims 24 disposed coaxially imagewise relative to the prime lens.

31. A lens assembly according to claim 30, further comprising a light sensor, disposed at or near the secondary image plane, to sense the secondary image.

32. A lens assembly according to claim 31, further comprising an image recorder to record the sensed secondary image.

* * * * *

UNITED STATES PATENT AND TRADEMARK OFFICE
CERTIFICATE OF CORRECTION

PATENT NO. : 5,703,716

DATED : December 30, 1997

INVENTOR(S) : Akiko Furuta

It is certified that error appears in the above-identified patent and that said Letters Patent is hereby corrected as shown below:

Column 1, line 55, "skill" should be --still--.

Column 3, lines 46, 48, 50, 52, 55, 58, 60, 63, 65, and 67, change the semicolon (";") to a period.

Column 4, lines 2, 3, 5, 8, 10, 12, 14, 15, 17, 19, 22, 24, and 26, change the semicolon (";") to a period.

Column 4, line 26, delete "and".

Column 6, line 30, "of" should be --or--.

Column 6, line 30, delete the word "a" after the word "and".

Column 9, line 62, in Table 1, Surface "135" should be Surface --134--.

Column 10, line 52, in Table 2, in the second column of the second row, "-161.61368" should be -- -61.61368 --.

Column 10, line 63, in Table 2, in the second column of the fifteenth row, "28.52426" should be --28.52456--.

Column 10, line 66, in Table 2, in the second column of the eighteenth row, --∞-- should be inserted.

Column 11, line 26, "(2)|D/f$_2$=0.46" should be --(2) |D/f$_2$| = 0.46--.

Column 12, line 11, in Table 3, in the third column of the third row, "6.2300" should be --6.200--.

UNITED STATES PATENT AND TRADEMARK OFFICE
CERTIFICATE OF CORRECTION

PATENT NO. : 5,703,716

DATED : December 30, 1997

INVENTOR(S) : Akiko Furuta

It is certified that error appears in the above-identified patent and that said Letters Patent is hereby corrected as shown below:

In the Claims:

Column 15, line 11, "$2<(r_1+r_2)/(r_1-R_2)<50$" should be --$2 < (r_1 + r_2)/(r_1 - r_2) < 50$--.

Column 18, line 39, "claims" should be --claim--.

Signed and Sealed this

Twentieth Day of October, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,703,716
DATED : Dec. 30, 1997
INVENTOR(S) : Akiko Furuta

It is certified that error appears in the above-indentified patent and that said Letters Patent is hereby corrected as shown below:

On the Cover Page:

In the first column, item [30], Foreign Application Priority Data, the Japanese patent application numbers should be -- 6-225644 -- and -- 6-225645 --.

Signed and Sealed this

Fifth Day of October, 1999

Attest:

Q. TODD DICKINSON

Attesting Officer

Acting Commissioner of Patents and Trademarks